US 11,212,164 B2

(12) United States Patent
Nandy et al.

(10) Patent No.: US 11,212,164 B2
(45) Date of Patent: Dec. 28, 2021

(54) PREVENTING MULTICAST OUTAGES IN RING NETWORKS

(71) Applicant: HEWLETT PACKARD ENTERPRISE DEVELOPMENT LP, Houston, TX (US)

(72) Inventors: Tathagata Nandy, Bangalore (IN); Venkatavaradhan Devarajan, Bangalore (IN); Prasad Moola Mangalam, Bangalore (IN); Viswanath Reddy Bayapureddy, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/850,526

(22) Filed: Apr. 16, 2020

(65) Prior Publication Data

US 2020/0336361 A1    Oct. 22, 2020

(30) Foreign Application Priority Data

Apr. 22, 2019 (IN) .............................. 201941015984

(51) Int. Cl.
*G06F 11/00* (2006.01)
*H04L 12/24* (2006.01)
(Continued)

(52) U.S. Cl.
CPC .......... *H04L 41/0654* (2013.01); *H04L 12/18* (2013.01); *H04L 12/1877* (2013.01); *H04L 12/437* (2013.01); *H04L 12/4641* (2013.01)

(58) Field of Classification Search
CPC ... H04L 41/0654; H04L 12/18; H04L 12/437; H04L 12/4641; H04L 12/1877
See application file for complete search history.

(56) References Cited

U.S. PATENT DOCUMENTS 8,085,676 B2    12/2011    Skalecki et al.
9,331,861 B2    5/2016     Bos et al.
(Continued)

FOREIGN PATENT DOCUMENTS

CN    103051536    4/2013
JP    2012119857   6/2012
(Continued)

OTHER PUBLICATIONS

EDGE-CORE, "ECS4660-28F, L3 Gigabit Metro Ethernet Switch," retrieved online Apr. 11, 2019, 4 pages, https://www.edge-core.com/_upload/Images/ECS4660-28F_DS_R03_20171003.pdf.

*Primary Examiner* — Richard G Keehn
(74) *Attorney, Agent, or Firm* — Hewlett Packard Enterprise Patent Department (57) ABSTRACT

Examples disclosed herein relate to a method comprising determining, at a first node, that a first Ethernet Ring Protection Switching (ERPS) port of the first node is down, wherein the first node belongs to a plurality of network nodes connected in a ring topology to form an access network. The method includes determining, at the first node, that the first ERPS port is a querier port, wherein the first ERPS port is paired with a second ERPS port of the first node and marking the second ERPS port as the querier port of the first node. The method includes transmitting, by the first node, an IGMP join message to a device part of a multicast implementation, wherein the multicast implementation covers at least the ring topology.

20 Claims, 4 Drawing Sheets

(51) Int. Cl.
*H04L 12/18* (2006.01)
*H04L 12/437* (2006.01)
*H04L 12/46* (2006.01)

(56) References Cited

U.S. PATENT DOCUMENTS

| | | |
|---|---|---|
| 10,091,023 B2 | 10/2018 | Subramaniam et al. |
| 2013/0083647 A1* | 4/2013 | Xie ........................ H04L 12/437 370/216 |
| 2014/0064061 A1* | 3/2014 | Kulambi ................ H04L 12/437 370/223 |
| 2016/0142225 A1* | 5/2016 | Taniguchi ................ H04L 12/42 370/223 |
| 2017/0324580 A1* | 11/2017 | Sun ...................... H04L 41/0668 |

FOREIGN PATENT DOCUMENTS

| | | | | |
|---|---|---|---|---|
| WO | WO-2008125675 | | 10/2008 | |
| WO | WO-2016173213 | A1 * | 11/2016 | ........... H04L 12/437 |

\* cited by examiner

PREVENTING MULTICAST OUTAGES IN RING NETWORKS

BACKGROUND

Network devices, such as routers, switches, hubs, and the like, communicably connect devices to each other. A network may include multiple network devices connected to one another in a particular arrangement to form a communication infrastructure of the network. The manner in which the various network devices and/or other devices are connected to each other may be referred to as the topology of the network.

One such network topology is a ring topology, in which a group of network devices are connected to each other in a ring, such that each of the network devices in the ring shares a first link with the peer network device adjacent to the network device on one side and shares a second link with the peer network device adjacent to the network device on the other side. Thus, there are two paths from any one network device in the ring to any other network device in the ring (a clockwise path and a counterclockwise path), providing redundancy in the event any link fails. Other devices, such as server blades, personal computers, storage arrays, and the like, may be connected to the network devices that form the ring, and may communicate with each other via the ring of network devices.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a" "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A ring network is a network topology in which each node connects to two other nodes in order to form a continuous pathway where data travels from node to node, with each node along the way handling every packet. A ring network may use an Ethernet Ring Protection (ERP) protocol to provide protection for Ethernet traffic in a ring topology, while ensuring that no loops are within the ring at the Ethernet layer. The loops are prevented by blocking traffic on either a predetermined link or a failed link.

Multicast is a method of group communication where data transmission is addressed to a group of destination computers simultaneously. Multicast can be one-to-many or many-to-many distribution.

Using multicast in a ring topology may introduce a variety of problems. For example, when a link failure occurs in the ring topology, the multicast communication may also become disrupted. Methods and systems described herein describe an IGMP module that listens to the ring network state for a link failure and perform certain actions when the link failure is detected.

A method for preventing multicast outages in ring networks may include determining, at a first node, that a first Ethernet Ring Protection Switching (ERPS) port of the first node is down, wherein the first node belongs to a plurality of network nodes connected in a ring topology to form an access network. The method may include determining, at the first node, that the first ERPS port is a querier port, wherein the first ERPS port is paired with a second ERPS port of the first node, marking, the second ERPS port as the querier port of the first node and transmitting, by the first node, an IGMP join message to a device part of a multicast implementation, wherein the multicast implementation covers at least the ring topology.

Figure 1A:
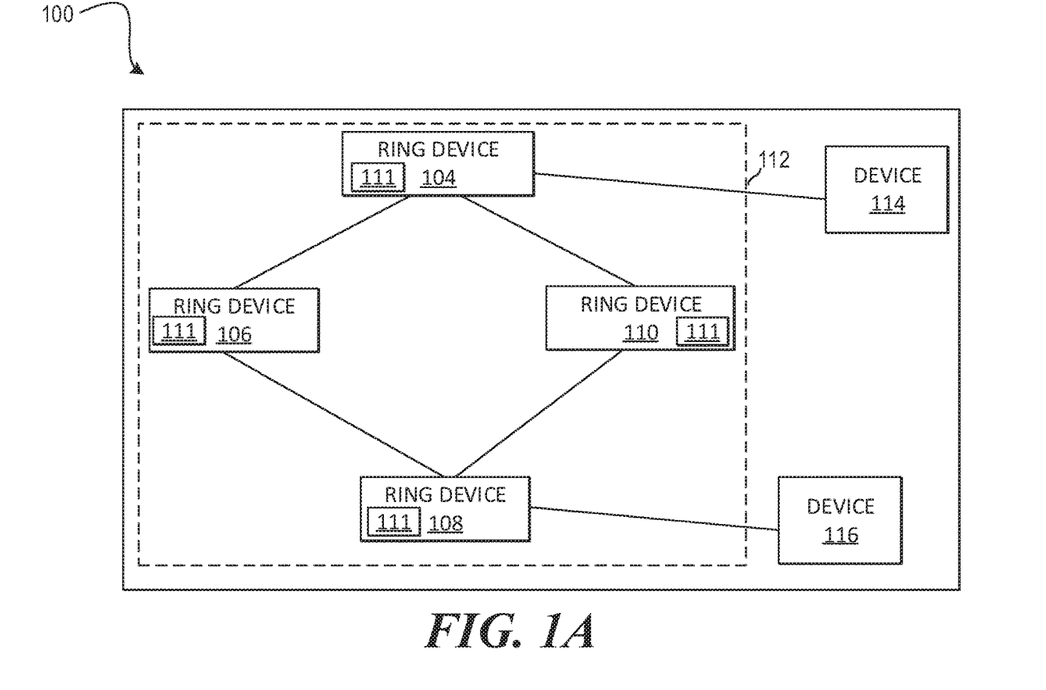
FIG. 1A is an example block diagrams of an example system for preventing multicast outages in ring networks.

FIG. 1A is a block diagram of an example system 100 where preventing multicast outages in ring networks may be useful. The system 100 may include a first ring device 104, a second ring device 106, a third ring device 108 and a fourth ring device 110.

Ring devices 104-110 may be any of a variety of network devices. A network device may be a device within a network that forwards packets sent by a sender device toward a recipient device (or multiple recipient devices). For example, ring devices 114-110 may be network switches.

A "packet" or "data packet" can refer to any unit of data that can be conveyed over a network. A packet or data packet may also refer to a frame or data frame, a data unit, a protocol data unit, and so forth.

The ring devices 104-110 may be connected to each other in a ring topology, and thus they may be referred to collectively as a ring network. Each ring device may be communicatively coupled to two other ring devices in the ring network. For example, the first ring device 104 may be communicatively coupled to second ring device 106 and the fourth ring device 110. Similarly, the second ring device 106 may be communicatively coupled to the first ring device 104 and the third ring device 108 and so on. The links communicatively coupling the ring devices 104-110 may be physical links, such as an Ethernet connection or other physical connection, a wireless connection, a virtual connection, etc.

Each of the ring devices 104-110 may include ring ports 111 that allow the ring devices 104-110 to connect to other devices. The ring ports may be, for example, Ethernet Ring Protection Switching (ERPS) ports. In particular, each of the ring devices 104-110 may include a pair of two ring ports 111-L and 111-R, which are each connected to a ring port 111-L or 111-R of the adjacent ring devices 104-110. The ring devices 104-110 may also have ports 111-D that may be connected to other devices, such as the customer devices 114 and 116. The number of ports 111 illustrated in FIG. 1A is merely an example, and any number of such ports 111 (including zero) may be included in any given ring device.

In some example configurations, any one of the ports 111 of a given ring device could serve as any one of the ring ports 111-L and 111-R, the uplink port 111-U, and the ports 111-D. Whether a given port 111 is a ring port 111-L or 111-R, an uplink port 111-U, or a port 111-D may be determined by which device the given port 111 is connected to. For example, whichever ports 111 of a given ring device 104-110 are connected to another one of the other ring devices 104-110 may be identified as the ring ports 111-L 111-R. In other words, prior to the ports 111 being connected to any other devices, none of the ports 111 are necessarily reserved to be the ring ports 111-L or 111-R, the uplink port 111-U, or the ports 111-D.

In other example configurations, one or more ports 111 may be reserved specifically to operate as one of the ring ports 111-L or 111-R, the uplink port 111-U, or the ports 111-D. For example, each ring devices 104-110 may have one port 111 that is specifically configured to function as the uplink port 111-U.

The links between adjacent ring devices 104-110 may be referred to as ring links. A broadcast communication on the ring network will be passed from each ring device to its adjacent peers via the ring links, and because all of the ring devices 104-110 are connected in a circle, such a broadcast communication will end up being distributed to every ring device in the ring network. However, if left unchecked this could result in a loop condition in which the message is repeatedly sent around the ring from ring device to ring device without end. Thus, the ring devices 104-110 are configured to prevent such loops within the ring network by keeping at least one ring link blocked at any given time, which ensures that any user traffic flowing around the ring will eventually meet a dead-end and stop.

An example protocol that implements this may be found in Recommendation G.8032 of the International Telecommunication Union Telecommunication Standardization Sector (ITU-T), which may be referred to as an Ethernet Ring Protection Switching (ERPS) protocol. The ring link that is designated to be blocked may be referred to the ring-protection-link (RPL), and one of the ring devices 104-110 may be designated as the owner of the RPL (referred to as the RPL owner).

One or more of the ring devices may also be communicatively coupled to one or more devices. The devices 114 and 116 may be any devices that can be connected to the ring devices 104-110. For example, the customer devices 114 and 116 may be servers, workstations, personal computers, storage devices (such as hard disk drives), security cameras, sensors, Internet of Things (IoT) devices and so on.

For example, first ring device 104 is communicatively coupled to first device 114 and third ring device 108 is communicatively coupled to second device 116. Of course, these connections are for illustrative purposes only and each of the ring devices in the ring network may be communicatively coupled to any number and type of devices.

One or more of the ring devices 104-110 and one or more of the devices 114 and 116 may be configured to form a virtual local-area-network (VLAN). A VLAN is a broadcast domain of a computer network that is isolated from other broadcast domains of the network at the data link layer, where a broadcast domain is a logical division in which all nodes thereof can reach each other by broadcast or multicast at the data link layer. A VLAN may be formed, for example, by assigning certain ports 111 of a ring device 104-110 to the VLAN, such that when the ring device receives a broadcast message for the VLAN, the ring device passes that message on to only those of its ports that are assigned to that VLAN. A VLAN may also be formed, for example, by logically associating specific devices with VLANs and tagging packets with a VLAN identifier, such that the ring device passes received packets on to only those devices that are associated with the VLAN that is indicated by the packet's tag. Although only one VLAN is described, there may be multiple VLANs formed on the ring devices 104-110.

The ring network may also use a multicast method of group communication. The Internet Group Management Protocol (IGMP) is a communications protocol used by hosts and adjacent network devices on certain networks to establish multicast group memberships. When IGMP is enabled on a network, one particular device, such as first ring device 104, may assume the role of a querier and transmit a host message to other connected devices. The querier typically sends a host message at certain intervals. Devices that receive the host message and decide to join the multicast group are referred to as non-querier devices. Each non-querier device that receivers the message marks the port on which the non-querier device receives the host message as a querier port. For example, ring devices 106, 108 and 110 may be non-querier devices in the multicast implementation of system 100 of FIG. 1A. One of ports 111 in each of the ring device 106-110 may be used as the querier port. For example, one of the ring ports 111-L and 111-R may be used as the querier port.

Non-querier devices respond back to the querier by forwarding join messages to the querier device in order to establish the group. In this manner, the querier learns the multicast ports (sometimes called joined port) of the non querier devices. The querier device is typically the network device that is connected to a source device and any multicast data packets would always be sent from the querier to the non-querier through the joined port. For example, one of the ring ports 111-L and 111-R of ring device 104 may be used as the querier port.

The non-querier devices propagate the host message to all its ports, which may include ports of a VLAN and the interested hosts that are connected to the non querier on the VLAN may reply with join messages in response to the Query. These join messages are forwarded to the querier and the querier would learn these as the joined port. Note all the hosts that are connected at different ports in the non querier device would be learnt by the querier as a single joined port. Multicast data from the querier would be forwarded to the non querier, via the joined port and then forwarded to the individual Host.

When using multicast in a ring topology, one of the devices in the ring may take the role of Querier device and one port of the querier device acts is marked as the port for all the non-querier devices. In the example system 100 in FIG. 1A, the ring device 104 may be the querier device and the ring devices 106-110 are non querier devices. In some aspects, one of the devices outside of the ring may take the roll of the querier device, such as, for example, device 114 of FIG. 1A.

In either case, when a link failure occurs in the ring, the multicast communication may also become disrupted. For instance, until the querier sends the next host message, the multicast communication is not updated to reflect the ring failure and the non-querier may not learn the new querier port. This may lead to a traffic hole as the non-querier would continue to send join messages to the old querier port and the joined Port would never be updated in the Querier Device.

Accordingly, one or more the devices in system 100 may incorporate an IGMP module that listens to the ring network state for a link failure and perform certain actions when the link failure is detected. An IGMP module may be a software module that manages label allocation for a network device.

Figure 1B:
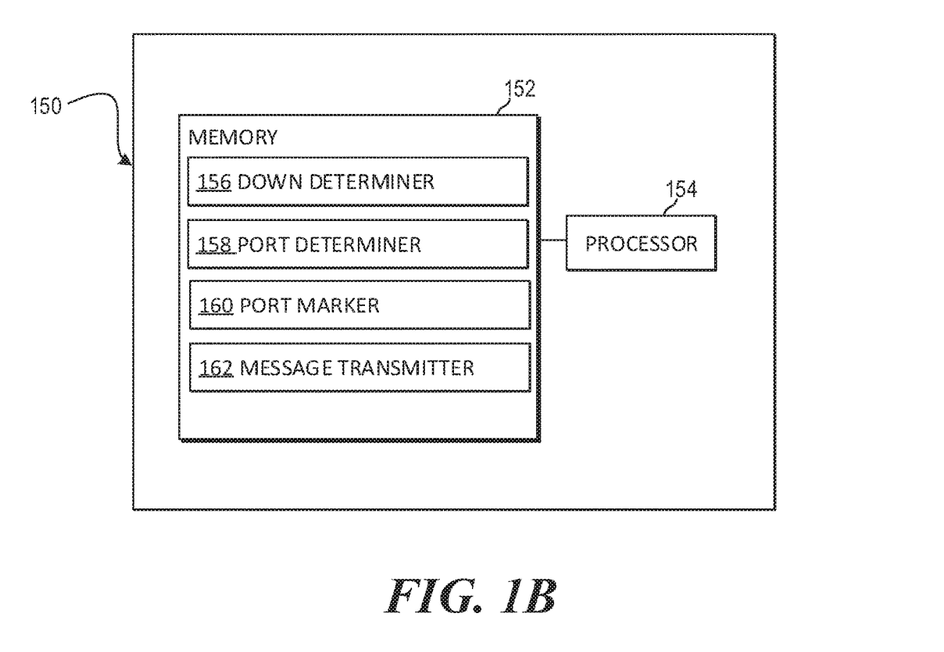
FIG. 1B is an example block diagrams of an example querier device that is also a ring device in a ring network.

FIG. 1B is a block diagram of an example querier device 150 that may be used for preventing multicast outages in ring networks. Querier device 150 may be used in aspect of system 100 where one of the ring devices, such as first ring device 104, is the querier device.

In this aspect, if the device on which the link failure occurs is the querier, the IGMP module on that device will send a host message on the paired ring port immediately and without waiting for the host message interval to expire. Additionally, the device will move all the joins from the old/failed port to the paired port immediately without waiting for responses to its host message.

Querier device 150 may include a processor 154 and a memory 152 that may be coupled to each other through a communication link (e.g., a bus). Processor 154 may include a single or multiple Central Processing Units (CPU) or another suitable hardware processor(s). In some examples, memory 152 may store machine readable instructions executed by processor 154, respectively, for device 150. Memory 152 may include any suitable combination of volatile and/or non-volatile memory, such as combinations of Random Access Memory (RAM), Read-Only Memory (ROM), flash memory, and/or other suitable memory.

Memory 152 stores instructions to be executed by processor 154 including instructions for down determiner 156, port determiner 158, port marker 160, message transmitter 162 and/or other components. According to various implementations, device 150 may be implemented in hardware and/or a combination of hardware and programming that configures hardware.

Processor 154 may execute down determiner 156 to determine, at a first node that a first Ethernet Ring Protection Switching (ERPS) port of the first node is down. The first node may belong to a plurality of network nodes connected in a ring topology to form an access network. As described above, the first node may be, for example, first ring device 104. The first node may be a querier of a multicast implementation on the ring topology. The first ERPS port may be, for example, ring port 111-L. of ring device 104. As described above, each of the ring devices 104-110 includes a pair of two ring ports 111-L and 111-R, which are each connected to a ring port 111-L or 111-R of the adjacent ring devices 106 and 110.

Processor 154 may execute port determiner 158 to determine, at the first node, that a second ERPS port of the first node can be used as a join port. The join port may be used by the querier to receive responses to the host message. The first ERPS port may be paired with a second ERPS port of the first node, Continuing the example of FIG. 1A, the first port may be ring port 111-L and the second paired port may be ring port 111-R.

In some aspects, a protocol state value may be used to track the status of the ring network. For example, an idle state may indicate that the ring network is operating normally and a protection state may indicate that the ring network has a link failure. In these aspects, processor 154 may execute port determiner 158 to determine, at the first node, that the protocol state value of the first node has changed from an idle state to a protection state.

Processor 154 may execute port marker 160 to mark the second ERPS port as the join port of the first node. In some aspects, processor 154 may execute a port handler to move each join from the first ERPS port to the second ERPS port before waiting for a response to the host message.

Processor 154 may execute message transmitter 162 to transmit, via the second ERPS port of the first node, a host message to a second node of the plurality of network nodes. The second node may be directly connected to the first node in the ring topology. For example, second node may be second ring device 106 of FIG. 1A. The message transmitter may transmit the host message before a host message timer expires.

In some aspects, one or more of the down determiner 156, port determiner 158, port marker 160, message transmitter 162, port handler and/or other components may be part of an IGMP module of the first node.

Figure 1C:
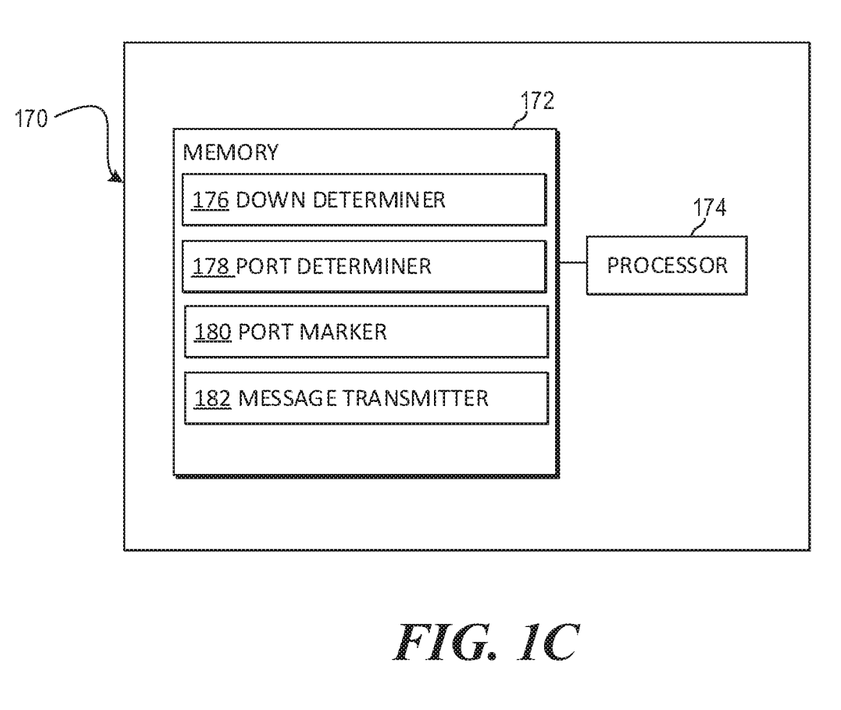
FIG. 1C is an example block diagrams of an example non-querier device that is also a ring device in a ring network.

FIG. 1C is a block diagram of an example non-querier device 170 that may be used for preventing multicast outages in ring networks. Non-querier device 170 may be used in an aspect of system 100 where one of the ring devices, such as second ring device 106, is the non-querier device.

In this aspect, if the link failure occurs on a ring device port which is a non-querier device port and the link failure port is the querier port, the IGMP module on that device may replay all of the local joins to a paired port on the ring device without waiting for a host message. Additionally, the paired ring port will be marked as the querier port. If the device on which the link failure occurs is a non-querier and the link failure port is not the querier port, the IGMP will take no additional action.

Non-querier device 170 may include a processor 174 and a memory 172 that may be coupled to each other through a communication link (e.g., a bus). Processor 174 may include a single or multiple Central Processing Units (CPU) or another suitable hardware processor(s). In some examples, memory 172 may store machine readable instructions executed by processor 174, respectively, for device 170. Memory 172 may include any suitable combination of volatile and/or non-volatile memory, such as combinations of Random Access Memory (RAM), Read-Only Memory (ROM), flash memory, and/or other suitable memory.

Memory 172 stores instructions to be executed by processor 174 including instructions for down determiner 176, port determiner 178, port marker 180, message transmitter 182 and/or other components. According to various implementations, device 170 may be implemented in hardware and/or a combination of hardware and programming that configures hardware.

Processor 174 may execute down determiner 176 to determining, at a first node, that a first Ethernet Ring Protection Switching (ERPS) port of the first node is down. The first node may belong to a plurality of network nodes connected in a ring topology to form an access network. As described above, the first node may be, for example, second ring device 106. The first node may be a non-querier of the multicast implementation on the ring topology. The first ERPS port may be, for example, ring port 111-L of second ring device 106. As described above, each of the network devices 104-110 includes a pair of two ring ports 111-L and 111-R, which are each connected to a ring port 111-L or 111-R of the adjacent ring devices.

Processor 154 may execute port determiner 158 to determine, at the first node, that the first ERPS port is a querier port, wherein the first ERPS port is paired with a second ERPS port of the first node. The querier port may be used by the non-querier to receive a host message from a querier. The first ERPS port may be paired with a second ERPS port of the first node. Continuing the example of FIG. 1A, the first port may be ring port 111-L and the second paired port may be ring port 111-R.

In some aspects, a protocol state value may be used to track the status of the ring network. For example, an idle state may indicate that the ring network is operating normally and a protection state may indicate that the ring network has a link failure. In these aspects, processor 154 may execute port determiner 158 to determine, at the first node, that the protocol state value of the first node has changed from an idle state to a protection state.

Processor 154 may execute port marker 160 to mark the second ERPS port as the querier port of the first node. In some aspects, the second ERPS port is marked as the querier port of the first node without waiting to receive a host message on the second ERPS port.

Processor 154 may execute message transmitter 162 to by the first node, an IGMP join message to a device part of a multicast implementation, wherein the multicast implementation covers at least the ring topology. The IGMP join message may be transmitted, via the second ERPS port of the first node, to a second node of the plurality of network nodes, wherein the second node is directly connected to the first node in the ring topology. For example, second node may be ring device 104 of FIG. 1A. The IGMP join message is transmitted to a network device that is not part of the ring topology. For example, the device may be one of devices 114 and/or 116.

In some aspects, an Internet Group Management Protocol (IGMP) join message is transmitted to a second node of the plurality of network nodes by an IGMP module. In some aspects, one or more of the down determiner 156, port determiner 158, port marker 160, message transmitter 162, port handler and/or other components may be part of an IGMP module of the first node.

Figure 1D:
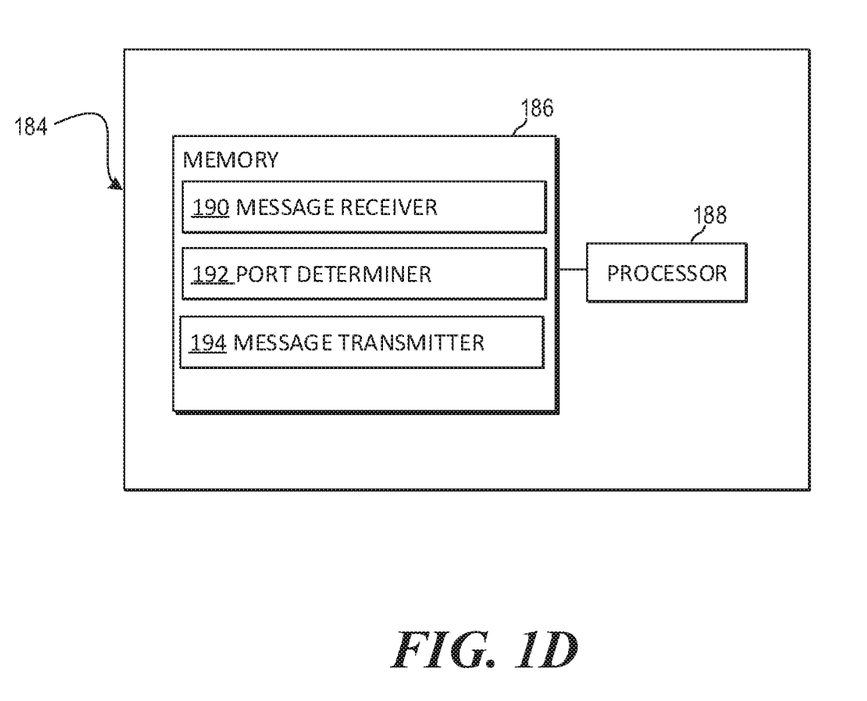
FIG. 1D is an example block diagrams of an example querier device that is communicatively coupled to at least one ring device in a ring network.

FIG. 1D is a block diagram of an example querier device 184 that may be used for preventing multicast outages in ring networks. Querier device 184 may be used in an aspect of system 100 where one of the non-ring devices, such as device 114, is the querier device.

In this aspect, if querier is not a node on the ring network but connected to one of the nodes of the ring, if the querier receives a report from a non-querier without a query being sent, the IGMP module will immediately send a host message to all the ports of the VLAN. This will in turn flow through the ring and will update the querier port in all the nodes of the ring.

Querier device 184 may include a processor 188 and a memory 186 that may be coupled to each other through a communication link (e.g., a bus). Processor 188 may include a single or multiple Central Processing Units (CPU) or another suitable hardware processor(s). In some examples, memory 186 may store machine readable instructions executed by processor 188, respectively, for device 184. Memory 186 may include any suitable combination of volatile and/or non-volatile memory, such as combinations of Random Access Memory (RAM), Read-Only Memory (ROM), flash memory, and/or other suitable memory.

Memory 186 stores instructions to be executed by processor 188 including instructions for message receiver 190, port determiner 192, message transmitter 194 and/or other components. According to various implementations, device 184 may be implemented in hardware and/or a combination of hardware and programming that configures hardware.

Processor 188 may execute message receiver 190 to receive, at a network device, a join message from a first node. The join message may not be received in response to a host message sent from the network device. The first node may be a node of a ring network, such as first ring device 104, that is connected to the network device. The first device may be a querier of a multicast implementation including devices part of the ring topology.

Processor 188 may execute port determiner 192 to determine, at the network device, that a first Ethernet Ring Protection Switching (ERPS) port of a node in the plurality of nodes is down, wherein the first node belongs to a plurality of network nodes connected in a ring topology to form an access network and the network device is not part of the ring topology. In some aspects, the first node may be the node in the plurality of nodes that is down. For example, a link failure may have occurred in a link using one of the ports of the node. In some aspects, the first node may not be the node that is down and a second node a second node is the node in the plurality of nodes that is down.

Processor 188 may execute message transmitter 194 to transmit a host message the first node of the plurality of network nodes, wherein the first node is directly connected to the network device. An IGMP module of the first device may transit the host message. In some aspects, one or more of the message receiver 190, port determiner 192 and message transmitter 194, port handler and/or other components may be part of an IGMP module of the first node.

Figure 2:
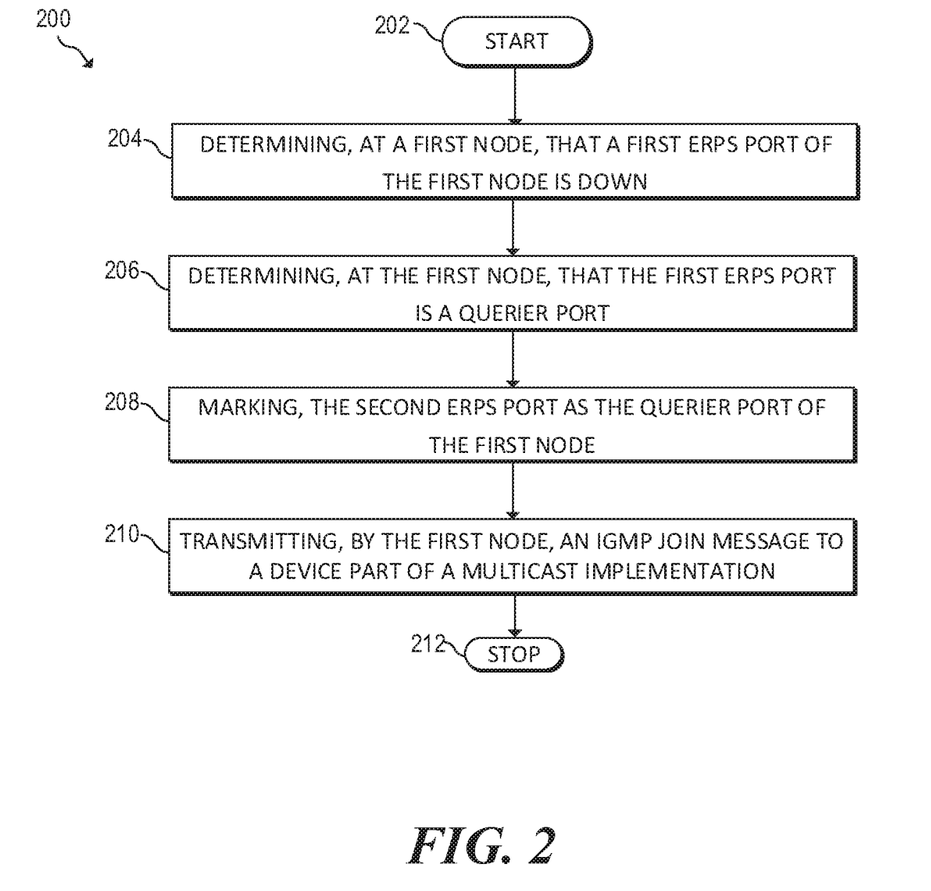
FIG. 2 is a flow diagram of an example method for preventing multicast outages in ring networks.

FIG. 2 is a flow diagram of a method 200 for preventing multicast outages in ring networks. The ring network may have a similar topology to system 100 described above. Accordingly, parts of and/or the entire method may be performed by one or more of the devices 104, 106, 108, 110, 114 and 116 of system 100. Although the description of FIG. 2 may refer to system 100 and other elements of FIG. 1A, this is for illustrative purposes only and the method described in FIG. 2 may be used in a variety of topologies.

The method may begin at block 202 and proceed to block 204 where the method may include determining, at a first node, that a first Ethernet Ring Protection Switching (ERPS) port of the first node is down, wherein the first node belongs to a plurality of network nodes connected in a ring topology to form an access network. At block 206, the method may include determining, at the first node, that the first ERPS port is a querier port, wherein the first ERPS port is paired with a second ERPS port of the first node. At block 208, the method may include marking the second ERPS port as the querier port of the first node and at block 210, the method may include transmitting, by the first node, an IGMP join message to a device part of a multicast implementation, wherein the multicast implementation covers at least the ring topology. The method may proceed to block 212, where the method may end.

Figure 3:
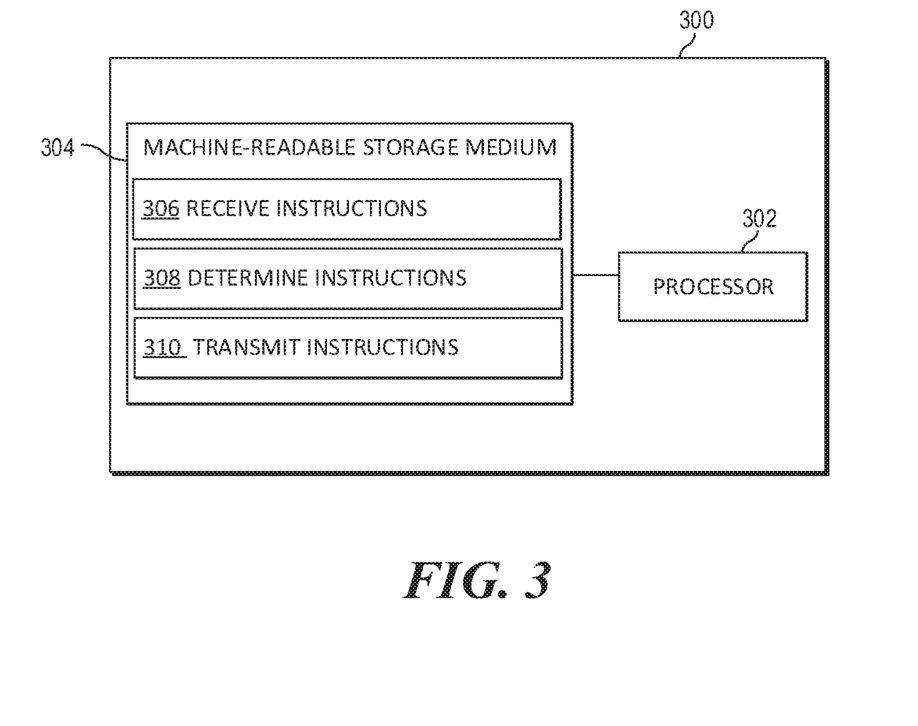
FIG. 3 is a block diagram of another example system for preventing multicast outages in ring networks.

FIG. 3 is a block diagram of an example system 300 for preventing multicast outages in ring networks. System 300 includes a processor 302 and a machine-readable storage medium 304. In some aspects, processor 302 and machine-readable storage medium 304 may be part of an Application-specific integrated circuit (ASIC). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 302 may be at least one central processing unit (CPU), microprocessor, and/or other hardware devices suitable for retrieval and execution of instructions stored in machine-readable storage medium 304. In the example illustrated in FIG. 3, processor 302 may fetch, decode, and execute instructions 306, 308 and 310. Processor 302 may include at least one electronic circuit comprising a number of electronic components for performing the functionality of at least one of the instructions in machine-readable storage medium 304. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 304 may be any electronic, magnetic, optical, or other physical storage device that stores executable instructions. Thus, machine-readable storage medium 304 may be, for example, Random Access Memory (RAM), an Electrically-Erasable Programmable Read-Only Memory (EEPROM), a storage drive, an optical disc, and the like. Machine-readable storage medium 304 may be disposed within system 300, as shown in FIG. 3. In this situation, the executable instructions may be "installed" on the system 300. Machine-readable storage medium 404 may be a portable, external or remote storage medium, for example, that allows system 300 to download the instructions from the portable/external/remote storage medium. In this situation, the executable instructions may be part of an "installation package". As described herein, machine-readable storage medium 304 may be encoded with executable instructions for context aware data backup. The machine-readable storage medium may be non-transitory.

Referring to FIG. 3, receive instructions 306, when executed by a processor (e.g., 302), may cause system 300 to receive, at a network device, a join message from a first node, wherein the join message is not received in response to a host message sent from the network device.

Determine instructions 308, when executed by a processor (e.g., 302), may cause system 300 to determine, at the network device, that a first Ethernet Ring Protection Switching (ERPS) port of a node in the plurality of nodes is down, wherein the first node belongs to a plurality of network nodes connected in a ring topology to form an access network and the network device is not part of the ring topology.

Transmit instructions 310, when executed by a processor (e.g., 302), may cause system 300 to transmit a host message the first node of the plurality of network nodes, wherein the first node is directly connected to the network device.

The foregoing disclosure describes a number of examples for preventing multicast outages in ring networks t. The disclosed examples may include systems, devices, computer-readable storage media, and methods for preventing multicast outages in ring networks. For purposes of explanation, certain examples are described with reference to the components illustrated in FIGS. 1A-3. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1A-3 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A system comprising:
a processor and
a storage device coupled to the processor and storing instructions which when executed by the processor cause the processor to:
determine, at a first node, that a first Ethernet Ring Protection Switching (ERPS) port of the first node is down, wherein the first node belongs to a plurality of network nodes connected in a ring topology to form an access network;
determine, at the first node, that a second ERPS port of the first node can be used as a join port, wherein the first ERPS port is paired with a second ERPS port of the first node;
mark the second ERPS port as the join port of the first node; and
transmit, via the second ERPS port of the first node, a host message to a second node of the plurality of network nodes, wherein the second node is directly connected to the first node in the ring topology.

2. The system of claim 1, the instructions further causing the processor to:
move each join from the first ERPS port to the second ERPS port before waiting for a response to the host message.

3. The system of claim 1, wherein the message transmitter transmits the host message before a host message timer expires.

4. The system of claim 1, wherein the first node is a querier of a multicast implementation on the ring topology.

5. The system of claim 1, wherein the join port is used by the querier to receive responses to the host message.

6. The system of claim 1, wherein the down determiner, port determiner, port marker and message transmitter are part of an Internet Group Management Protocol (IGMP) module of the first node.

7. The system of claim 1, wherein the first node has a protocol state value, the system comprising:
the down determiner to determine, at the first node, that the protocol state value of the first node has changed from an idle state to a protection state.

8. A method comprising:
determining, at a first node, that a first Ethernet Ring Protection Switching (ERPS) port of the first node is down, wherein the first node belongs to a plurality of network nodes connected in a ring topology to form an access network;
determining, at the first node, that the first ERPS port is a querier port, wherein the first ERPS port is paired with a second ERPS port of the first node;
marking the second ERPS port as the querier port of the first node; and
transmitting, by the first node, an IGMP join message to a device part of a multicast implementation, wherein the multicast implementation covers at least the ring topology.

9. The method of claim 8, wherein the IGMP join message is transmitted, via the second ERPS port of the first node, to a second node of the plurality of network nodes, wherein the second node is directly connected to the first node in the ring topology.

10. The method of claim 8, wherein the IGMP join message is transmitted to a network device that is not part of the ring topology.

11. The method of claim 8, wherein the first node is a non-querier of the multicast implementation on the ring topology.

12. The method of claim 11, wherein the querier port is used by the non-querier to receive a host message from a querier.

13. The method of claim 8, wherein the first node has a protocol state value, the method comprising:

determining, at the first node, that the protocol state value of the first node has changed from an idle state to a protection state.

14. The method of claim 8, wherein the second ERPS port is marked as the querier port of the first node without waiting to receive a host message on the second ERPS port.

15. The method of claim 8 comprising:

transmitting, by an IGMP module, an Internet Group Management Protocol (IGMP) join message to a second node of the plurality of network nodes.

16. A non-transitory computer-readable storage medium encoded with instructions, the instructions executable by a processor of a system to cause the system to:

receive, at a network device, a join message from a first node, wherein the join message is not received in response to a host message sent from the network device;

determine, at the network device, that a first Ethernet Ring Protection Switching (ERPS) port of a node in the plurality of nodes is down, wherein the first node belongs to a plurality of network nodes connected in a ring topology to form an access network and the network device is not part of the ring topology; and transmit a host message the first node of the plurality of network nodes, wherein the first node is directly connected to the network device.

17. The non-transitory computer-readable storage medium of claim 16, wherein the first node is the node in the plurality of nodes that is down.

18. The non-transitory computer-readable storage medium of claim 16, wherein a second node is the node in the plurality of nodes that is down.

19. The non-transitory computer-readable storage medium of claim 16, wherein the first device is a querier of a multicast implementation including devices part of the ring topology.

20. The non-transitory computer-readable storage medium of claim 16, wherein an IGMP module transits the host message.

* * * * *